United States Patent
Maity (10) Patent No.: US 8,260,841 B1
(45) Date of Patent: Sep. 4, 2012

(54) EXECUTING AN OUT-OF-BAND AGENT IN AN IN-BAND PROCESS OF A HOST SYSTEM

(75) Inventor: Sanjoy Maity, Snellville, GA (US)

(73) Assignee: American Megatrends, Inc., Norcross, GA (US)

( * ) Notice: Subject to any disclaimer, the term of this patent is extended or adjusted under 35 U.S.C. 154(b) by 315 days.

(21) Appl. No.: 12/338,667

(22) Filed: Dec. 18, 2008

Related U.S. Application Data (60) Provisional application No. 61/014,696, filed on Dec. 18, 2007.

(51) Int. Cl.
*G06F 15/16* (2006.01)
*G06F 11/00* (2006.01)
*G06F 15/173* (2006.01)
*H04L 12/40* (2006.01)

(52) U.S. Cl. ........... 709/202; 709/223; 726/22; 370/438
(58) Field of Classification Search .................. None
See application file for complete search history.

(56) References Cited

U.S. PATENT DOCUMENTS

| | | | |
|---|---|---|---|
| 2006/0206666 A1* | 9/2006 | Lambert et al. | 711/115 |
| 2007/0005992 A1* | 1/2007 | Schluessler et al. | 713/193 |
| 2007/0168481 A1* | 7/2007 | Lambert et al. | 709/223 |
| 2008/0083030 A1* | 4/2008 | Durham et al. | 726/22 |

OTHER PUBLICATIONS

U.S. Appl. No. 12/026,940, filed Feb. 6, 2008, entitled "Configuring a Host Computer Using a Service Processor." Inventor: Subash Kalbarga.

* cited by examiner

*Primary Examiner* — Wen-Tai Lin
(74) *Attorney, Agent, or Firm* — Morris Manning & Martin, LLP; Tim Tingkang Xia, Esq.

(57) ABSTRACT

Technologies are described herein for executing an out-of-band agent in an in-band process of a host system. An out-of-band connection is created between a service processor located on a host computer and a remote management device. The service processor receives an agent program from the remote management device over the out-of-band connection and stores the agent program in a storage area. The agent program is made available to an in-band process of the host system operating on the host computer through a standard storage device interface. The agent program is then executed out-of-band by the service processor or in-band by the process of the host system.

23 Claims, 5 Drawing Sheets

EXECUTING AN OUT-OF-BAND AGENT IN AN IN-BAND PROCESS OF A HOST SYSTEM

CROSS-REFERENCE TO RELATED APPLICATION

This application claims the benefit of U.S. provisional patent application No. 61/014,696, filed on Dec. 18, 2007, entitled "Out-of-Band Agents for a System's In-Band Services," which is expressly incorporated herein by reference in its entirety.

BACKGROUND

A service processor, or baseboard management controller, is a component of a host computing system that provides configuration, management, and monitoring services to the host system. The service processor generally operates independently from the host system, often relying on its own firmware, memory, and connections to hardware components. The service processor may even use a separate power supply to enhance reliability. The service processor may be used to configure hardware components, to maintain BIOS settings or system parameters, or to monitor the health of the host system, such as temperatures, fan speeds, voltages, and alarms. Because the service processor is capable of operating independently of the host system, or "out-of-band," the service processor can operate in a pre-boot environment of the host system or in the event of a host system failure.

A service processor may provide a communication channel that allows a remote management client to access the services of the service processor for maintenance of the host system. The service processor may include the capability to redirect the console of the host system to the remote management client or to allow the remote management client to view POST and boot messages, cycle the power of the host system, perform software resets, or perform other maintenance and configuration tasks. However, some tasks, such as installing an operating system ("OS") component on the host system, modifying OS configuration parameters, or monitoring high-level OS faults, may not be able to be performed out-of-band by the service processor, but may require "in-band" execution in the host system.

It is with respect to these considerations and others that the disclosure made herein is presented.

SUMMARY

Technologies are described herein for executing an out-of-band agent in an in-band process of a host system. In particular, through the use of the technologies provided herein, an agent program may be provided to a host computer through an out-of-band connection established with a service processor located in the host computer. The agent program may then be executed out-of-band by the service processor or in-band by processes of the host system operating on the host computer to perform various configuration, maintenance, and monitoring tasks.

According to one aspect presented herein, an out-of-band connection is created between a service processor located on a host computer and a remote management device. The service processor then receives an agent program from the remote management device. In one aspect the remote management device uploads the agent program to the service processor over the out-of-band connection. The service processor then stores the agent program in a storage area.

In another aspect, the service processor maps a virtual storage device to a storage area containing the agent program on the remote management device over the out-of-band connection. In a further aspect, the agent program is made available to an in-band process of a host system operating on the host computer through a standard storage device interface. The agent program is then executed out-of-band by the service processor or in-band by the process of the host system.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for providing agents through an out-of-band connection to a host system for execution in an in-band process of the host system. In the following detailed description, references are made to the accompanying drawings that form a part hereof, and which are shown by way of exemplary embodiments and implementations. Note that although the subject matter presented herein has been described in conjunction with one or more particular embodiments and implementations, it is to be understood that the embodiments are not necessarily limited to the specific structure, configuration, or functionality described herein. Rather, the specific structure, configuration, and functionality described herein are disclosed as examples. Various modifications and changes may be made to the subject matter described herein without following the exemplary embodiments and applications illustrated and described, and without departing from the true spirit and scope of the embodiments.

Figure 1:
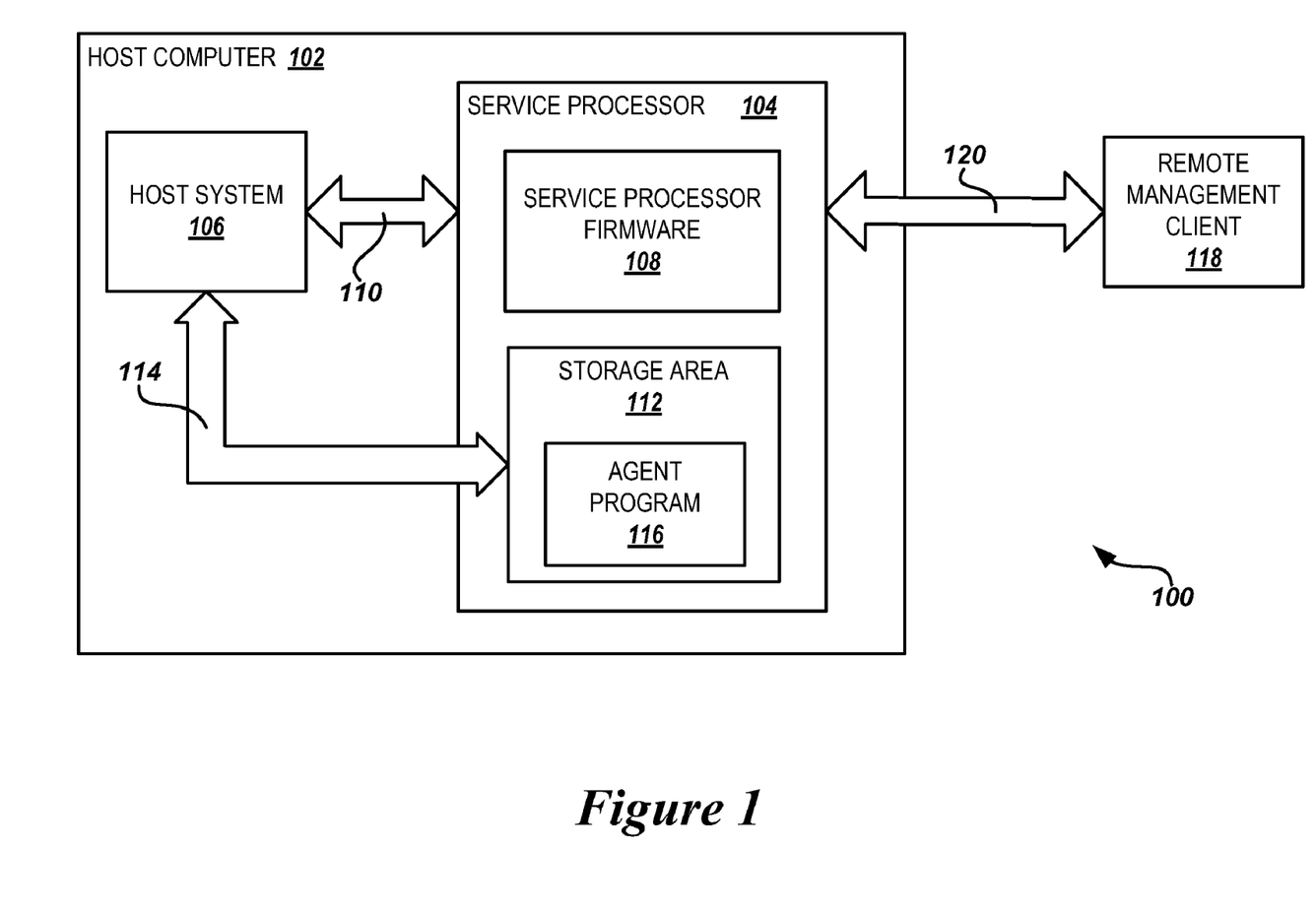
FIG. 1 is a block diagram showing aspects of an illustrative operating environment and several hardware and software components provided by the embodiments presented herein.

FIG. 1 is a block diagram showing an illustrative operating environment 100 according to embodiments described herein. The environment 100 includes a host computer 102.

The host computer 102 may be a server computer or any other computing device known in the art. The host computer 102 includes a service processor 104. According to embodiments, the service processor 104 is a hardware component of the host computer 102 that runs independently from the host system 106 and provides functionality for emergency management, remote connectivity, configuration, and management of the host computer 102. An example service processor 104 is described in co-pending U.S. patent application Ser. No. 12/026,940 entitled "Configuring a Host Computer Using a Service Processor," which is expressly incorporated herein by reference in its entirety. The service processor 104 may be integrated into the host computer 102 as an embedded processor chip or as an add-in card.

The service processor 104 includes a service processor firmware 108. The service processor firmware 108 provides the functionality to the service processor 104 for configuring, managing, and monitoring of the host computer 102. The service processor firmware 108 may provide a comprehensive operating environment for the service processor 104, such as that provided by the AMI MEGARAC®-SP service processor software stack from American Megatrends, Inc. of Norcross, Ga. The service processor 104 may interface with the primary hardware and software systems (herein referred to as the host system 106) of the host computer 102 through a set of common interfaces 110 that allow monitoring and management of the host computer, such as the intelligent platform management interface ("IPMI").

As further illustrated in FIG. 1, the service processor 104 may contain a storage area 112. The storage area 112 may be implemented in an internal memory of the service processor, such as a fixed, local NAND flash memory. Alternatively, the storage area 112 may be implemented by any other suitable type of storage device, such as a fixed or removable flash memory device; a fixed or removable disk drive or other magnetic storage device; a fixed or removable optical storage device; a random access memory ("RAM"); an electrically erasable programmable read-only memory ("EEPROM"); and the like.

According to embodiments described herein, the storage area 112 is made accessible to the host system 106 through a standard storage device interface 114. This may be accomplished by the service processor 104 emulating an associated local storage device over a connection between the service processor and a hardware interface of the host computer 102. For example, the service processor 104 may be connected to the Universal Serial Bus ("USB") interface of the host computer 102, as will be described below in regard to FIG. 5. The service processor 104 may expose the storage areas 112 to the host system 106 through the USB interface such that the host system "sees" the storage area as a standard USB flash memory device. It will be appreciated that the storage device interface 114 emulated by the service processor 104 may be any suitable type of interface that allows the host system 106 to see a compatible, local storage device, including, but not limited to, an RS-232 serial interface, an integrated drive electronics ("IDE") interface, and AT Attachment ("ATA") interface, or a serial ATA ("SATA") interface.

According to one embodiment, the storage area 112 may contain an agent program 116. The agent program 116 is a software program or software image that may be executed by the service processor 104 or an in-band process on the host system 106. The agent program 116 may perform any number of maintenance, configuration, and/or monitoring tasks, including, but not limited to, configuring the service processor platform; configuring a hardware device on the host computer 102; configuring BIOS settings of the host system 106; installing OS components, monitors, or utility programs in the OS of the host system; or configuring OS parameters.

For example, the agent program 116 may be a software program executable by the service processor 104 that updates or "flashes" the firmware or BIOS of the host system 106. In another example, the agent program 116 may be a software image that, when presented to the OS of the host system 106 on the storage device emulated by the service processor 104 over the storage device interface 114, appears as an installation program to the OS. The OS of the host system 106 may be configured to recognize the installation program on the emulated storage device, and execute the installation program, as in the case of "AutoRun" functionality. When the installation portion of agent program 116 is executed, the agent program may then install an OS component or application, such as a driver, modify configuration parameters of the OS, or monitor and correct high-level OS faults.

In a further example, the agent program 116 may be a software image that, when presented to the BIOS of the host system 106 on the storage device emulated by the service processor 104 over the storage device interface 114, appears to be a bootable drive containing a boot loader and other initialization programs. When the host system 106 is booted on the host computer 102, the BIOS of the host system may load the boot image from the agent program 116, allowing the agent program to execute tasks during boot-up of the host system, such as flashing the BIOS of the host system or configuring a RAID drive.

It will be appreciated that many agent programs 116 may be imagined by one skilled in the art beyond those described herein, and that these agent programs may be executed out-of-band by the service processor 104, or in-band by the BIOS or other firmware of the host system 106, the OS of the host system, or any other process running on the host system. It is intended that all such agent programs 116 be included in this application. It will be further appreciated that the storage area 112 may contain any number of agent programs 116 beyond the single agent program shown in FIG. 1.

The service processor 104 may provide access to the configuration and management functions of the host computer 102 to a remote management client 118 connected to the service processor through an out-of-band connection 120. The out-of-band connection 120 may be established over a local-area network ("LAN"), a wide-area network ("WAN"), a serial connection, or other connection means connecting the remote management client 118 and the service processor 104. The out-of-band connection 120 may utilize hardware of the host computer 102, such as an Ethernet controller, that is shared between the host system 106 and the service processor 104, or the out-of-band connection may be established utilizing independent hardware of the service processor.

In one embodiment, the service processor firmware 108 provides facilities that allow the connected remote management client 118 to upload agent programs 116 to the storage area 112 of the service processor 104. The remote management client 118 may then initiate execution of the agent program 116 on the service processor 104, or cause the agent program to be executed by an in-band process of the host system 106, as will be discussed in more detail below in regard to FIG. 3. The service processor firmware 108 may use any suitable protocol that allows the remote management client 118 to upload, configure, and initiate the agent programs 116 over the out-of-band connection, including, but not limited to, the hypertext transfer protocol ("HTTP"), the file transfer protocol ("FTP"), the network file system ("NFS") protocol, or the server message block ("SMB") protocol.

Figure 2:
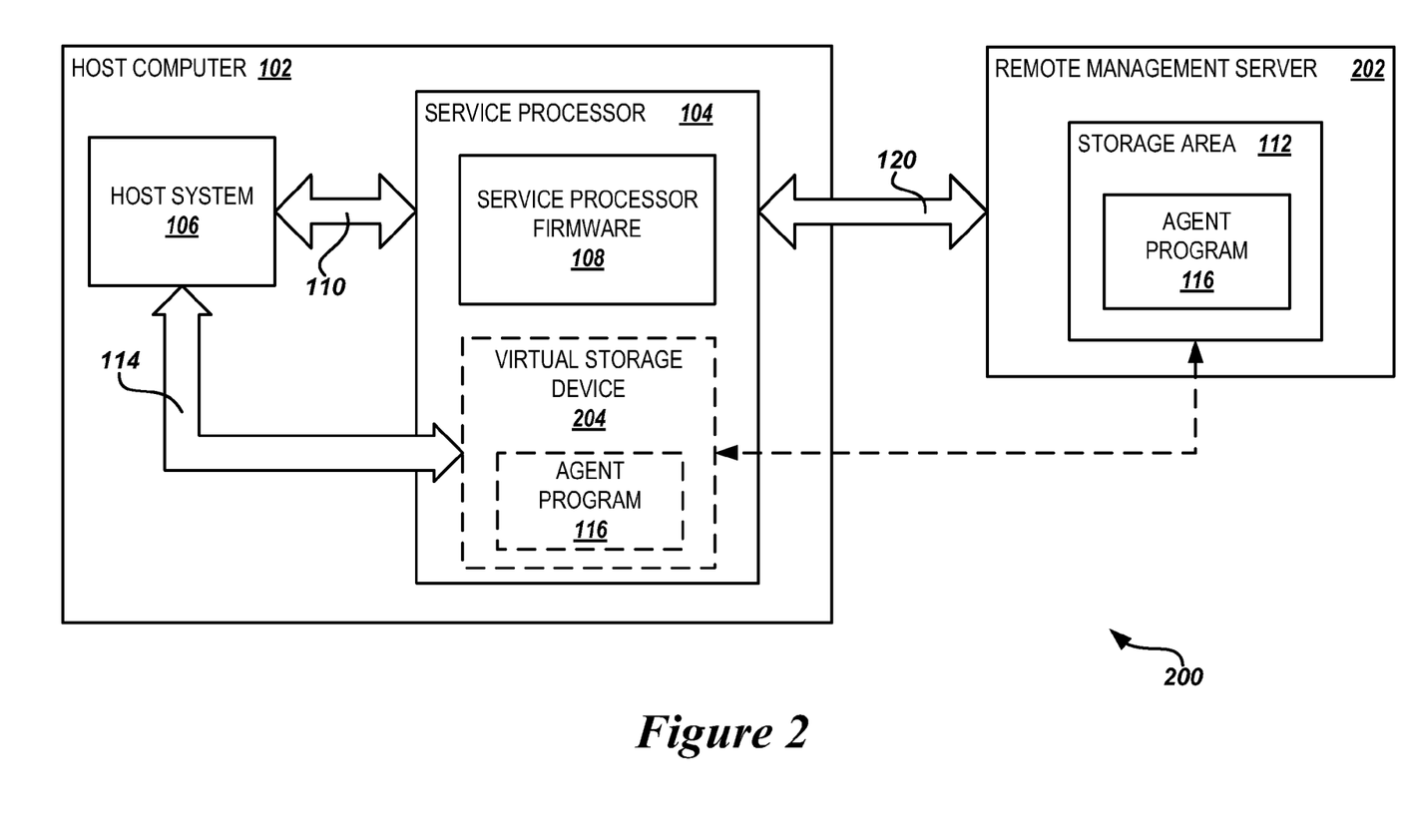
FIG. 2 is a block diagram showing an alternative operating environment, according to further embodiments presented herein.

FIG. 2 is a block diagram showing an additional operating environment 200, according to a further embodiment. In the environment 200 shown in FIG. 2, the service processor 104 on the host computer 102 is connected to a remote management server 202 over the out-of-band connection 120. The remote management server 202 includes the storage area 112 that contains the agent program 116 described above. According to one embodiment, the service processor firmware 108 creates a virtual storage device 204 on the service processor 104 mapped to the storage area 112 on the remote management server 202. This is may be accomplished over the out-of-band connection 120 using a file sharing protocol, such as SMB or NFS, or by any other method known for mapping a virtual storage device 204 to a remote storage area 112. The virtual storage device 204 is then exposed to the host system 106 as a local storage device through the storage device interface 114, as described above.

As further described above, both the service processor 104 and the host system 106 may access the virtual storage device 204 as if it was a local storage device. The agent program 116 located on the storage area 112 of the remote management server 202 may then be initiated by the service processor 104 on the host computer 102, the BIOS or firmware of the host system 106, the OS of the host system, or any other in-band process of the host system, as will be discussed in greater detail in regard to FIG. 4. The present embodiment is advantageous when the service processor 104 does not have sufficient flash memory or other storage to store the agent program 116 image, such as when booting the host computer 102 to a remote OS.

Figure 3:
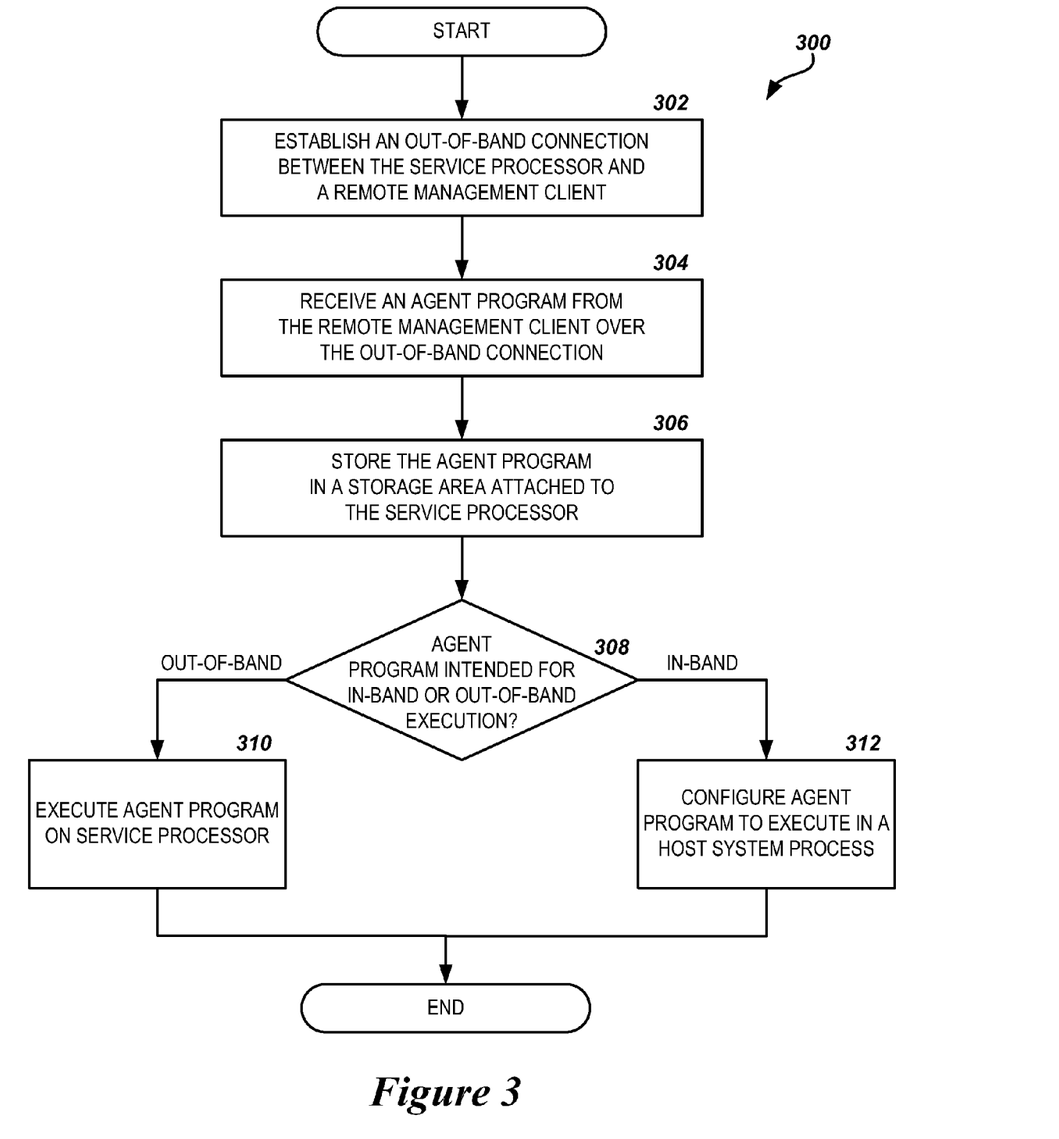
FIG. 3 is a flow diagram illustrating one method for executing an out-of-band agent in an in-band process of a host system, according to embodiments presented herein.
Figure 4:
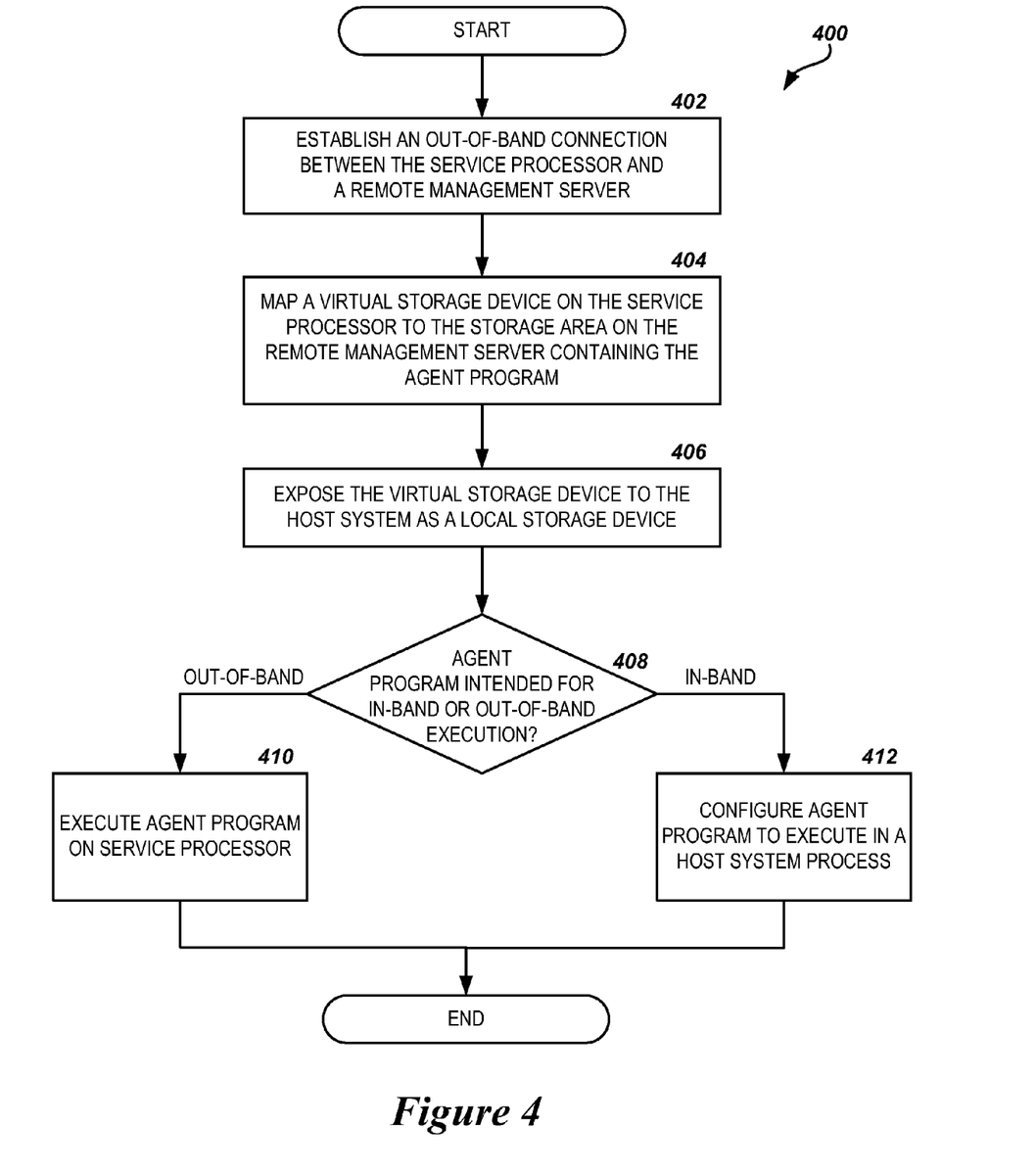
FIG. 4 is a flow diagram illustrating another method for executing an out-of-band agent in an in-band process of a host system, according to embodiments presented herein.

Turning now to FIGS. 3 and 4, additional details will be provided regarding the embodiments presented herein for executing an out-of-band agent in an in-band process of the host system. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 3 is a flow diagram showing a routine 300 for executing an agent program in either an out-of-band process or an in-band process of a host system 106, according to one exemplary embodiment. The routine 300 begins with operation 302, where an out-of-band connection 120 is established between the service processor 104 on the host computer 102 and a remote management client 118. The out-of-band connection 120 may be established in response to an attempt by the remote management client 118 to access the service processor 104 on the host computer 102. For example, the remote management client 118 may attempt to access the service processor 104 platform on the host computer 102 using a Web browser over an HTTP-based out-of-band connection 120.

Once the out-of-band connection 120 is established between the remote management client 118 and the service processor 104, the routine 300 proceeds from operation 302 to operation 304, where the service processor receives an agent program 116 from the remote management client over the out-of-band connection. The remote management client 118 may upload the agent program 116 to the service processor 104 over the HTTP session established between the service processor and the remote management client, for example. In another embodiment, the agent program 116 may be located locally on the service processor 104, such as a frequently used agent program that installs an OS fault monitor in the OS of the host system 106. The OS fault monitor may be able to detect high-level OS faults not detectable by the service processor 104, such as RAID system errors or disk partition errors. The frequently used agent program 116 may be stored as part of the service processor firmware 108 on the service processor 104. In this embodiment, the remote management client 118 may specify the agent program 116 which is to be utilized without having to upload the software image for the agent program over the out-of-band connection.

From operation 304, the routine 300 proceeds to operation 306, where the service processor 104 stores the agent program 116 received from the remote management client 118 in the storage area 112 of the service processor. In the case of a frequently used agent program 116 stored as part of the service processor firmware 108, the service processor 104 may copy the frequently used agent program from the service processor firmware into the storage area 112. As described above in regard to FIG. 1, by placing the agent program 116 in the storage area 112, the agent program is made accessible to both the service processor 104 and in-band processes of the host system 106 through the storage device interface 114.

Next, the routine 300 proceeds from operation 306 to operation 308, where the service processor 104 determines if the agent program 116 is intended for out-of-band execution on the service processor or in-band execution in a process of the host system 106. This may be specified by the remote management client 118 upon uploading the agent program 116 to the service processor 104. If the agent program 116 is intended for out-of-band execution, the routine 300 proceeds to operation 310, where the agent program 116 is executed on the service processor 104. This may be the case when the agent program 116 executes a function for configuring a hardware component to which the service processor 104 is connected, such as configuring power features, alarms, or system monitors. From operation 310, the routine then ends.

If, at operation 308, the service processor 104 determines that the agent program 116 is intended for in-band execution, then the routine 300 proceeds to operation 312, where the service processor 104 configures the agent program and the storage device interface 114 appropriately based on the manner of in-band execution of the agent program. For example, if the agent program 116 is a software image containing an installation program for the OS of the host system 106, as described above in regard to FIG. 1, then the service processor 104 may initiate the correct signaling on the storage device interface 114 to indicate to the OS that the emulated storage device has been initialized, such as the signaling sent over the USB interface when a removable USB flash drive is inserted into a USB port on the host computer 102. This may, in turn, cause the OS to initiate the installation program component of the agent program 116 using the AutoRun feature of the OS, for example.

In a further example, if the agent program 116 is a software image containing a boot loader and other initialization programs for the execution of an operating environment on the host system 106, as described above in regard to FIG. 1, then the service processor 104 may perform a software reset of the host computer to cause the host system to reboot. The BIOS of the host system may then load the boot image from the agent program 116, allowing the agent program to execute the desired tasks during boot-up of the host system. It will be appreciated that other methods for the service processor 104 to initiate execution of the agent program 116 in an in-band process of the host system 106 may be imagined, based upon the function of the agent program uploaded to the storage area 112, and it is intended that this application include all such methods. From operation 312, the routine 300 ends.

FIG. 4 is a flow diagram showing another routine 400 for executing an agent program in either an out-of-band process or an in-band process of a host system 106, according to another embodiment. The routine 400 begins with operation 402, where an out-of-band connection 120 is established between the service processor 104 on the host computer 102 and a remote management server 202, as described above in regard to FIG. 2. The out-of-band connection 120 may be established in response to a request by a remote management client 118 to access the agent program 116 stored in the storage area 112 of the remote management server 202, or the out-of-band connection may be initiated by the service processor 104 in response to a timed management event or other signal.

Once the out-of-band connection 120 is established between the remote management server 202 and the service processor 104, the routine 400 proceeds from operation 402 to operation 404, where the service processor 104 maps a local virtual storage device 204 to the storage area 112 of the remote management server containing the agent program 116, as further described above in regard to FIG. 2. The mapping occurs over the out-of-band connection 120 established between the remote management server 202 and the service processor 104.

From operation 404, the routine 400 proceeds to operation 406, where the service processor 104 exposes the virtual storage device 204 to the host system 106 by emulating a local storage device through the standard storage device interface 114, as described above in regard to FIG. 1. In this way, the agent program 116 contained in the storage area 112 of the remote management server 202 is made available to both the service processor 104 and the host system 106 across the storage device interface 114. It will be appreciated that, because the service processor 104 operates independently of the host system 106 on the host computer 102, and maintains the out-of-band connection 120 over independent network connections, the local storage device emulated by the service processor 104 over the storage device interface 114 remains available to the host system, even if the host system on the host computer is restarted. It this way, the storage area 112 of the remote management server 202 containing the agent program 116 appears as a local storage device on the host computer immediately upon initialization, or boot-up, of the host system 106.

From operation 406, the routine 400 proceeds to operation 408, where the service processor 104 determines if the agent program 116 is intended for out-of-band execution on the service processor or in-band execution in a process of the host system 106, as described above in regard to operation 308. If the agent program 116 is intended for out-of-band execution, the routine 400 proceeds to operation 410, where the agent program 116 is executed on the service processor 104. From operation 410, the routine ends. If, however, the service processor 104 determines at operation 408 that the agent program 116 is intended for in-band execution, then the routine 400 proceeds to operation 412, where the service processor 104 configures the agent program and the storage device interface 114 appropriately based on the manner of in-band execution of the agent program, as described above in regard to operation 312. From operation 412, the routine 400 ends.

Figure 5:
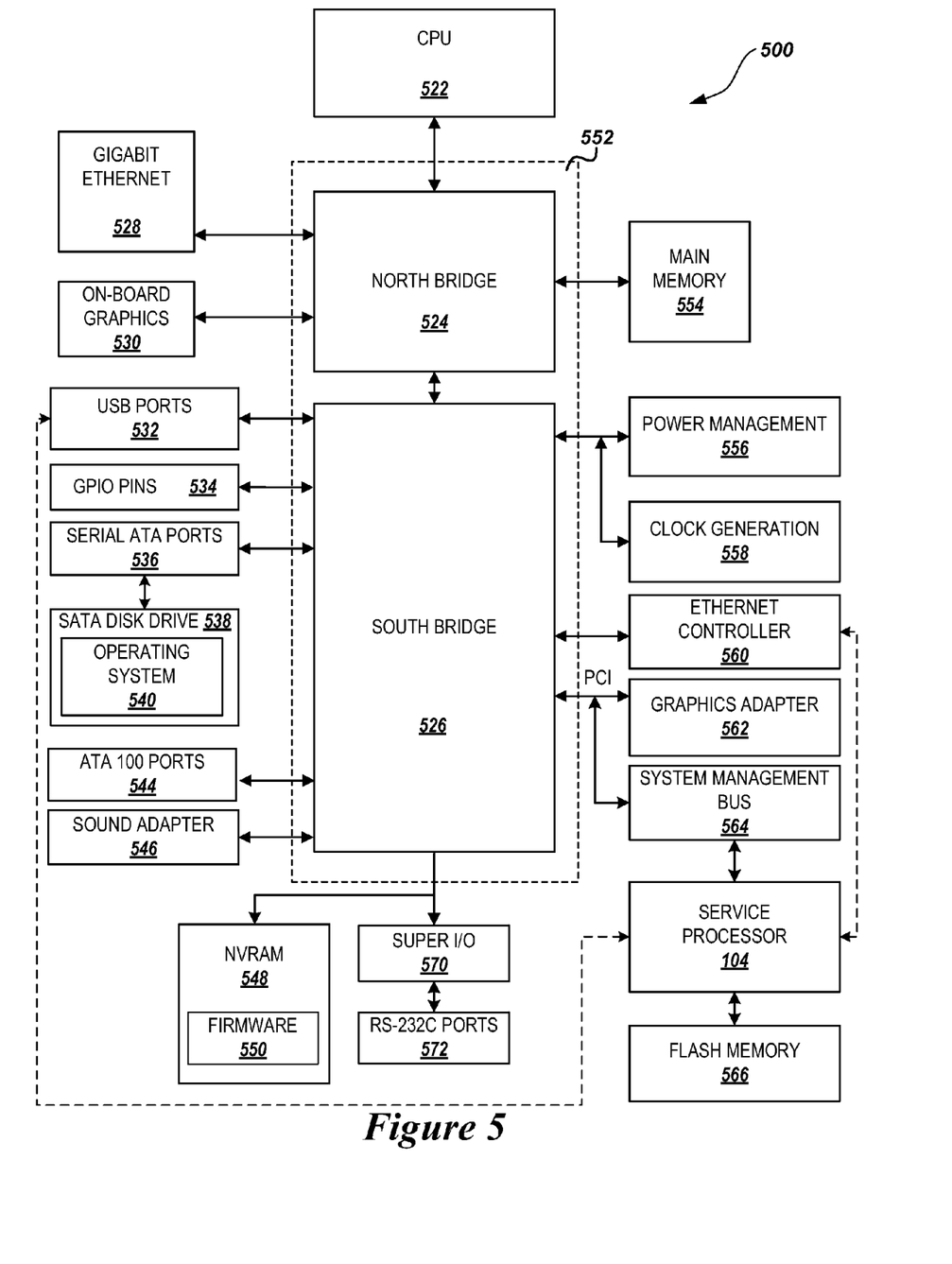
FIG. 5 is a block diagram showing illustrative computer hardware and software architectures for a computing system capable of implementing aspects of the embodiments presented herein.

FIG. 5 and the following discussion are intended to provide a brief, general description of a suitable computing environment in which the embodiments described herein may be implemented. While the technical details are presented herein in the general context of program modules that execute in conjunction with the execution of an operating system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices FIG. 5 shows a computer architecture for an illustrative computer 500 that may be utilized to embody the hardware and software components presented herein for the host computer 102 described above in regard to FIG. 1. Some or all of the architecture shown in FIG. 5 may also be utilized to implement the remote management client 118 or the remote management server 202. As discussed above, other types of computers and computing devices may also be utilized to implement the embodiments presented herein.

The computer 500 includes a baseboard, or "motherboard", which is a printed circuit board to which a multitude of components or devices may be connected by way of a system bus or other electrical communication path. In one illustrative embodiment, a CPU 522 operates in conjunction with a chipset 552. The CPU 522 is a standard central processor that performs arithmetic and logical operations necessary for the operation of the computer. The computer 500 may include a multitude of CPUs 522.

The chipset 552 includes a north bridge 524 and a south bridge 526. The north bridge 524 provides an interface between the CPU 522 and the remainder of the computer 500. The north bridge 524 also provides an interface to a random access memory ("RAM") used as the main memory 554 in the computer 500 and, possibly, to an on-board graphics adapter 530. The north bridge 524 may also include functionality for providing networking functionality through a gigabit Ethernet adapter 528. The gigabit Ethernet adapter 528 is capable of connecting the computer 500 to another computer via a network. Connections that may be made by the network adapter 528 may include LAN or WAN connections. LAN and WAN networking environments are commonplace in offices, enterprise-wide computer networks, intranets, and the Internet. The north bridge 524 is connected to the south bridge 526.

The south bridge 526 is responsible for controlling many of the input/output functions of the computer 500. In particular, the south bridge 526 may provide one or more universal serial bus ("USB") ports 532, a sound adapter 546, an Ethernet controller 560, and one or more general-purpose input/output ("GPIO") pins 534. The south bridge 526 may also provide a bus for interfacing peripheral card devices such as a graphics adapter 562. In one embodiment, the bus comprises a peripheral component interconnect ("PCI") bus. The south bridge 526 may also provide a system management bus 564 for use in managing the various components of the computer 500. Additional details regarding the operation of the system management bus 564 and its connected components are provided below.

The south bridge 526 is also operative to provide one or more interfaces for connecting mass storage devices to the computer 500. For instance, according to an embodiment, the south bridge 526 includes a serial advanced technology attachment ("SATA") adapter for providing one or more SATA ports 536 and an ATA 100 adapter for providing one or more ATA 100 ports 544. The SATA ports 536 and the ATA 100 ports 544 may be, in turn, connected to one or more mass storage devices such as SATA disk drive 538 storing an operating system 540 and application programs. As known to those skilled in the art, an operating system 540 comprises a set of programs that control operations of a computer and allocation of resources. An application program is software that runs on top of the operating system software, or other runtime environment, and uses computer resources to perform application specific tasks desired by the user. According to one embodiment of the invention, the operating system 540 comprises the LINUX operating system. According to another embodiment of the invention the operating system 540 comprises the WINDOWS SERVER operating system from MICROSOFT CORPORATION. According to another embodiment, the operating system 540 comprises the UNIX or SOLARIS operating system. It should be appreciated that other operating systems may also be utilized.

The mass storage devices connected to the south bridge 526, and their associated computer-readable media, provide non-volatile storage for the computer 500. Although the description of computer-readable media contained herein refers to a mass storage device, such as a hard disk or CD-ROM drive, it should be appreciated by those skilled in the art that computer-readable media can be any available media that can be accessed by the computer 500. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information.

A low pin count ("LPC") interface may also be provided by the south bridge 526 for connecting a "Super I/O" device 570. The Super I/O device 570 is responsible for providing a number of input/output ports, including a keyboard port, a mouse port, a serial interface 572, a parallel port, and other types of input/output ports. The LPC interface may also connect a computer storage media such as a ROM or a flash memory such as a NVRAM 548 for storing the firmware 550 that includes program code containing the basic routines that help to start up the computer 500 and to transfer information between elements within the computer 500.

As described briefly above, the south bridge 526 may include a system management bus 564. The system management bus 564 may be connected to the service processor 104. As described above, the service processor 104 includes functionality for monitoring the operation and configuring aspects of the host computer 102. In one embodiment, the service processor 104 is an independent component with its own hardware and firmware, which runs independently from the host system 106 of the computer 500. According to the embodiments described herein, the service processor 104 may be communicatively connected to one or more components of the computer 500 by way of the system management bus 564. For example, the service processor 104 may be connected to the USB ports 532 and/or the Ethernet controller 560 provided by the computer 500. Further, the service processor 104 may be coupled to several megabytes of fixed local NAND flash memory, used as a general storage area for the service processor, such as the storage area 112 described above in regard to FIG. 1.

It should be appreciated that the computer 500 may comprise other types of computing devices, including hand-held computers, embedded computer systems, personal digital assistants, and other types of computing devices known to those skilled in the art. It is also contemplated that the computer 500 may not include all of the components shown in FIG. 5, may include other components that are not explicitly shown in FIG. 5, or may utilize an architecture completely different than that shown in FIG. 5.

Based on the foregoing, it should be appreciated that technologies for executing an out-of-band agent in an in-band process of a host system are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method of executing an agent program on a host computer, the method comprising:
    establishing an out-of-band connection between a service processor located on a host computer and a remote management client having an executable agent program;
    receiving the agent program at the host computer from the remote management client over the out-of-band connection;
    storing the received agent program in a storage area of the service processor and operably connected to the service processor; and
    selectively allowing the host computer to access the storage area to execute the agent program, including
        selectively emulating a first interface of a plurality of storage interfaces such that the storage area is accessible by the host computer through the first interface and the host computer executes the agent program stored in the storage area; and
        selectively emulating a second interface of the plurality of storage interfaces such that the storage area is accessible by the host computer through the second interface and the host computer executes the agent program stored in the storage area, wherein the plurality of storage interfaces each are communicative to the host computer, wherein the first interface differs from the second interface.

2. The method of claim 1, wherein causing the agent program to be executed by the host computer comprises executing the agent program by the service processor located on the host computer.

3. The method of claim 1, wherein the storage area is configured such that the agent program is available to an in-band process of a host system operating on the host computer, and wherein causing the agent program to be executed by the host computer comprises causing the agent program to be executed in the in-band process of the host system.

4. The method of claim 1, wherein the agent program is operable to configure a hardware device of the host computer.

5. The method of claim 1, wherein the agent program is operable to modify at least one of a BIOS or a firmware of the host computer.

6. The method of claim 1, wherein the agent program is operable to install a component of an operating system operating on the host computer.

7. The method of claim 1, comprising:
allowing, by the service processor in response to a first instruction specified by the remote management client, the host computer to access the storage area; and
disallowing, by the service processor in response to a second instruction specified by the remote management client, the host computer to access the storage area as well as executing, by the service processor, the agent program stored in the storage area.

8. The method of claim 1, comprising:
emulating, by the service processor, the first interface in response to a first manner of execution detected from the agent program; and
emulating, by the service processor, the second interface in response to a second manner of execution detected from the agent program.

9. The method of claim 8, wherein the plurality of storage interfaces include:
a universal serial bus interface;
an RS-232 serial interface;
an integrated drive electronics interface;
an AT Attachment (ATA) interface; and
and a serial ATA (SATA) interface.

10. The method of claim 1, wherein the service processor executes the agent program to update software of the host computer out-of-band.

11. The method of claim 1, wherein an operating system of the host computer accesses, through the emulated first interface, the agent program as installation program.

12. The method of claim 11, wherein the emulated second interface is an interface of a bootable drive, wherein the BIOS of the host computer accesses, through the emulated second interface, the agent program as a boot loader.

13. A computer storage medium having computer-readable instructions stored thereon that, when executed by a service processor integrated into a host computer, cause the service processor to:
establish an out-of-band connection between the service processor and a remote management client having an executable agent program;
receive the agent program at the host computer from the remote management client over the out-of-band connection;
store the received agent program in a storage area of the service processor and operably connected to the service processor, wherein the storage area is configured such that the agent program is available to an in-band process of a host system operating on the host computer; and
selectively allow the host computer to access the storage area to execute the agent program, including
selectively emulate a first interface of a plurality of storage interfaces such that the storage area is accessible by the host computer through the first interface and the host computer executes the agent program stored in the storage area; and
selectively emulate a second interface of the plurality of storage interfaces such that the storage area is accessible by the host computer through the second interface and the host computer executes the agent program stored in the storage area, wherein the plurality of storage interfaces each are communicative to the host computer, wherein the first interface differs from the second interface.

14. The computer storage medium of claim 13, wherein the storage area is configured such that the agent program is exposed to the operating system of the host system as at least one of an installation program and a bootable storage device, wherein causing the agent program to be executed in the in-band process of the host system comprises at least one of causing the operating system of the host system to execute the installation program and rebooting the host system from the agent program, respectively.

15. The computer storage medium of claim 13, wherein the agent program is operable to configure a hardware device of the host computer.

16. The computer storage medium of claim 13, wherein the agent program is operable to modify at least one of a BIOS or a firmware of the host computer.

17. The computer storage medium of claim 13, wherein the agent program is operable to install a component of an operating system operating on the host computer.

18. A computer storage medium having computer-readable instructions stored thereon that, when executed by a service processor integrated into a host computer, cause the service processor to:
establish an out-of-band connection between the service processor and a remote management server;
map a virtual storage device to a storage area of the remote management server over the out-of-band connection, wherein the storage area contains an executable agent program;
expose the virtual storage device mapped to the storage area of the remote management server as a local storage device to a host system operating on the host computer; and
selectively allow the host system to access the virtual storage device to execute the agent program, including
selectively emulate a first interface of a plurality of storage interfaces such that the virtual storage device is accessible by the host system through the first interface and the host system executes the agent program; and
selectively emulate a second interface of the plurality of storage interfaces such that the virtual storage is accessible by the host system through the second interface and the host system executes the agent program, wherein the plurality of storage interfaces each are communicative to the host system, wherein the first interface differs from the second interface.

19. The computer storage medium of claim 18, wherein the storage area of the remote management server is configured such that the agent program is exposed to an operating system of the host system as an installation program, and wherein causing the agent program to be executed in the in-band process of the host system comprises causing the operating system of the host system to execute the installation program.

20. The computer storage medium of claim 18, wherein the storage area is configured such that the agent program is exposed to an operating system of the host system as a bootable storage device, and wherein causing the agent program to be executed in the in-band process of the host system comprises rebooting the host system from the agent program.

21. The computer storage medium of claim 18, wherein the agent program is operable to configure a hardware device of the host computer.

22. The computer storage medium of claim 18, wherein the agent program is operable to modify at least one of a BIOS or a firmware of the host computer.

23. The computer storage medium of claim 18, wherein the agent program is operable to install a component of an operating system operating on the host computer.

* * * * *